United States Patent
Kumar et al.

(10) Patent No.: US 8,873,638 B2
(45) Date of Patent: Oct. 28, 2014

(54) METHOD AND APPARATUS FOR PROVIDING MULTI-THREADED VIDEO DECODING

(75) Inventors: Chirantan Kumar, New Delhi (IN); Sudhakara Rao Kimidi, Srikakulam (IN)

(73) Assignee: Nokia Corporation, Espoo (FI)

( * ) Notice: Subject to any disclaimer, the term of this patent is extended or adjusted under 35 U.S.C. 154(b) by 784 days.

(21) Appl. No.: 13/025,611

(22) Filed: Feb. 11, 2011

(65) Prior Publication Data

US 2011/0194617 A1    Aug. 11, 2011

(30) Foreign Application Priority Data

Feb. 11, 2010  (IN) .............................. 336/CHE/2010

(51) Int. Cl.
| | | |
|---|---|---|
| H04N 7/12 | (2006.01) | |
| H04N 19/51 | (2014.01) | |
| H04N 19/436 | (2014.01) | |
| H04N 19/61 | (2014.01) | |
| H04N 19/44 | (2014.01) | |
| H04N 19/172 | (2014.01) | |
| H04N 19/13 | (2014.01) | |

(52) U.S. Cl.
CPC ... *H04N 19/00684* (2013.01); *H04N 19/00521* (2013.01); *H04N 19/00781* (2013.01); *H04N 19/00121* (2013.01); *H04N 19/00533* (2013.01); *H04N 19/00266* (2013.01)
USPC ............ 375/240.25; 375/240.12; 375/240.16; 375/240.28

(58) Field of Classification Search
CPC .................. H04N 19/00266; H04N 19/00521; H04N 19/00533; H04N 19/00684; H04N 19/00781; H04N 19/00121
USPC .............. 375/240.25, 240.12, 240.16, 240.28
See application file for complete search history.

(56) References Cited

U.S. PATENT DOCUMENTS

| | | | | |
|---|---|---|---|---|
| 7,190,289 | B2 * | 3/2007 | Kobayashi et al. | ........... 341/107 |
| 7,266,147 | B2 * | 9/2007 | Deshpande | .............. 375/240.01 |

(Continued)

FOREIGN PATENT DOCUMENTS

| | | |
|---|---|---|
| CN | 101543037 A | 9/2009 |
| CN | 101620527 A | 1/2010 |
| WO | 2009/078743 A1 | 6/2009 |

OTHER PUBLICATIONS

Sihn et al., "Novel Approaches to Parallel H.264 Decoder on Symmetric Multicore Systems", IEEE International Conference on Acoustics, Speech and Signal Processing, Apr. 19-24, 2009, pp. 2017-2020.

International Search Report received for corresponding Patent Cooperation Treaty Application No. PCT/FI2011/050063, dated Jun. 10, 2011, 13 pages.

(Continued)

*Primary Examiner* — Behrooz Senfi
*Assistant Examiner* — Maria Vazquez Colon
(74) *Attorney, Agent, or Firm* — Harrington & Smith

(57) ABSTRACT

An apparatus for enabling provision of multi-thread video decoding may include at least one processor and at least one memory including computer program code. The at least one memory and the computer program code may be configured, with the processor, to cause the apparatus to perform at least assigning decoding of a respective video frame to a corresponding thread for each core processor of a multi-core processor in which each respective video frame is divided into macroblock rows, resolving dependencies for each respective video frame at a macroblock row level, and providing synchronization for video decoding of each corresponding thread at the macroblock row level. A corresponding method and computer program product are also provided.

15 Claims, 6 Drawing Sheets

(56) References Cited

U.S. PATENT DOCUMENTS

| | | | |
|---|---|---|---|
| 8,213,518 B1* | 7/2012 | Wang et al. | 375/240.25 |
| 8,311,111 B2* | 11/2012 | Xu et al. | 375/240.13 |
| 8,422,553 B2* | 4/2013 | Fukuhara et al. | 375/240.02 |
| 2008/0022320 A1* | 1/2008 | Ver Steeg | 725/78 |
| 2008/0089412 A1 | 4/2008 | Ugur et al. | |
| 2008/0107184 A1 | 5/2008 | Katsavounidis et al. | |
| 2008/0159408 A1* | 7/2008 | Degtyarenko | 375/240.25 |
| 2008/0187053 A1 | 8/2008 | Zhao et al. | |
| 2008/0240254 A1 | 10/2008 | Au et al. | |
| 2008/0260021 A1 | 10/2008 | Sung | |
| 2009/0028246 A1* | 1/2009 | Miyoshi et al. | 375/240.16 |
| 2009/0175548 A1 | 7/2009 | Fukuhara et al. | 382/233 |
| 2009/0327662 A1 | 12/2009 | Jiang et al. | 712/217 |
| 2010/0098166 A1* | 4/2010 | Budagavi et al. | 375/240.16 |

OTHER PUBLICATIONS

Meenderinck et al., "Parallel Scalability of Video Decoders", Technical Report, Jun. 30, 2008, pp. 1-50.

Seitner et al., "Evaluation of data-parallel splitting approaches for H.264 decoding", Proceedings of the 6th International Conference on Advances in Mobile Computing and Multimedia, Nov. 24-26, 2008, 10 Pages.

Richter et al., "Adaptive multithreaded H.264/AVC decoding", Proceedings of the Forty-Third Asilomar Conference on Signals, Systems and Computers, Nov. 1-4, 2009, pp. 886-890.

"On2 Technologies Unveils New Advanced Video Compression Format", Linux Magazine, PRNewswire—FirstCall/IBC, Retrieved on Dec. 21, 2012, from online at: http://www.linux-mag.com/id/6867/.

* cited by examiner

METHOD AND APPARATUS FOR PROVIDING MULTI-THREADED VIDEO DECODING

RELATED APPLICATION

This application claims priority benefit to Indian Patent Application No. 336/CHE/2010, filed Feb. 11, 2010 which is incorporated herein by reference in its entirety.

TECHNICAL FIELD OF THE INVENTION

Embodiments of the present invention relate generally to video decoding technology and, more particularly, relate to a method and apparatus for multi-threaded video decoding.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer Current and future networking technologies continue to facilitate ease of information transfer and convenience to users by expanding the capabilities of mobile electronic devices. Various applications and software have also been developed and continue to be developed in order to give the users robust capabilities to perform tasks, communicate, obtain information or services, entertain themselves, etc. in mobile environments. Given the robust capabilities of mobile electronic devices and the relatively small size of such devices, it is becoming increasingly common for individuals to keep mobile electronic devices on or near their person on a nearly continuous basis. Moreover, because such devices are useful for work, play, leisure, entertainment, and other purposes, many users also interact with their devices on a frequent basis.

Along with the continuous development of new applications and improved networks that have expanded the capabilities of mobile electronic devices, hardware improvements have also been introduced. In this regard, the use of multi-core processors has become very common in relation to improving the capabilities of fixed electronic devices (e.g., personal computers (PCs)). While multi-core processors can increase processing capability, and have begun to see use in mobile communication devices more frequently due to their robust processing capabilities, multi-core processors may face some restrictions when used in connection with mobile electronic devices. Since mobile electronic devices are typically battery powered, using a multi-core processor could drain battery resources at a faster rate.

Accordingly, strategies for reducing battery power during processing may be desirable when employing multi-core processors in mobile electronic devices. Clocking multi-core processors for mobile electronic devices at a lower rate (relative to the clock speeds in PCs) is one example of a strategy for managing mobile electronic device battery consumption. However, it may be possible to experience the benefit of multi-core processing while implementing other strategies that may improve battery consumption characteristics as well.

BRIEF SUMMARY

A method, apparatus and computer program product are therefore provided for enabling the implementation of multi-core decoding of video sequence data in multiple threads. Some embodiments may implement symmetric multi-core processing (SMP) to process multiple threads of a video sequence with synchronization on a macroblock row level. Thus, some embodiments may reduce overhead by requiring less frequent synchronization than alternative multi-thread video decoding techniques. Accordingly, battery consumption characteristics for multi-core processors in mobile devices may be improved.

However, embodiments may be employed in connection with fixed devices and/or mobile devices having multi-core processors to enable improved video decoding of higher resolution and higher frame rate video sequences.

In one exemplary embodiment, a method of providing multi-thread video decoding is provided. The method may include assigning decoding of a respective video frame to a corresponding thread for each core processor of a multi-core processor in which each respective video frame is divided into macroblock rows, resolving dependencies for each respective video frame at a macroblock row level, and providing synchronization for video decoding of each corresponding thread at the macroblock row level.

In another exemplary embodiment, a computer program product for providing multi-thread video decoding is provided. The computer program product includes at least one computer-readable storage medium having computer-executable program code instructions stored therein. The computer-executable program code instructions may include program code instructions for assigning decoding of a respective video frame to a corresponding thread for each core processor of a multi-core processor in which each respective video frame is divided into macroblock rows, resolving dependencies for each respective video frame at a macroblock row level, and providing synchronization for video decoding of each corresponding thread at the macroblock row level.

In another exemplary embodiment, an apparatus for providing multi-thread video decoding is provided. The apparatus may include at least one processor and at least one memory including computer program code. The at least one memory and the computer program code may be configured, with the processor, to cause the apparatus to perform at least assigning decoding of a respective video frame to a corresponding thread for each core processor of a multi-core processor in which each respective video frame is divided into macroblock rows, resolving dependencies for each respective video frame at a macroblock row level, and providing synchronization for video decoding of each corresponding thread at the macroblock row level.

Embodiments of the invention may provide a method, apparatus and computer program product for employment in devices so that, for example, device users may enjoy improved capabilities with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
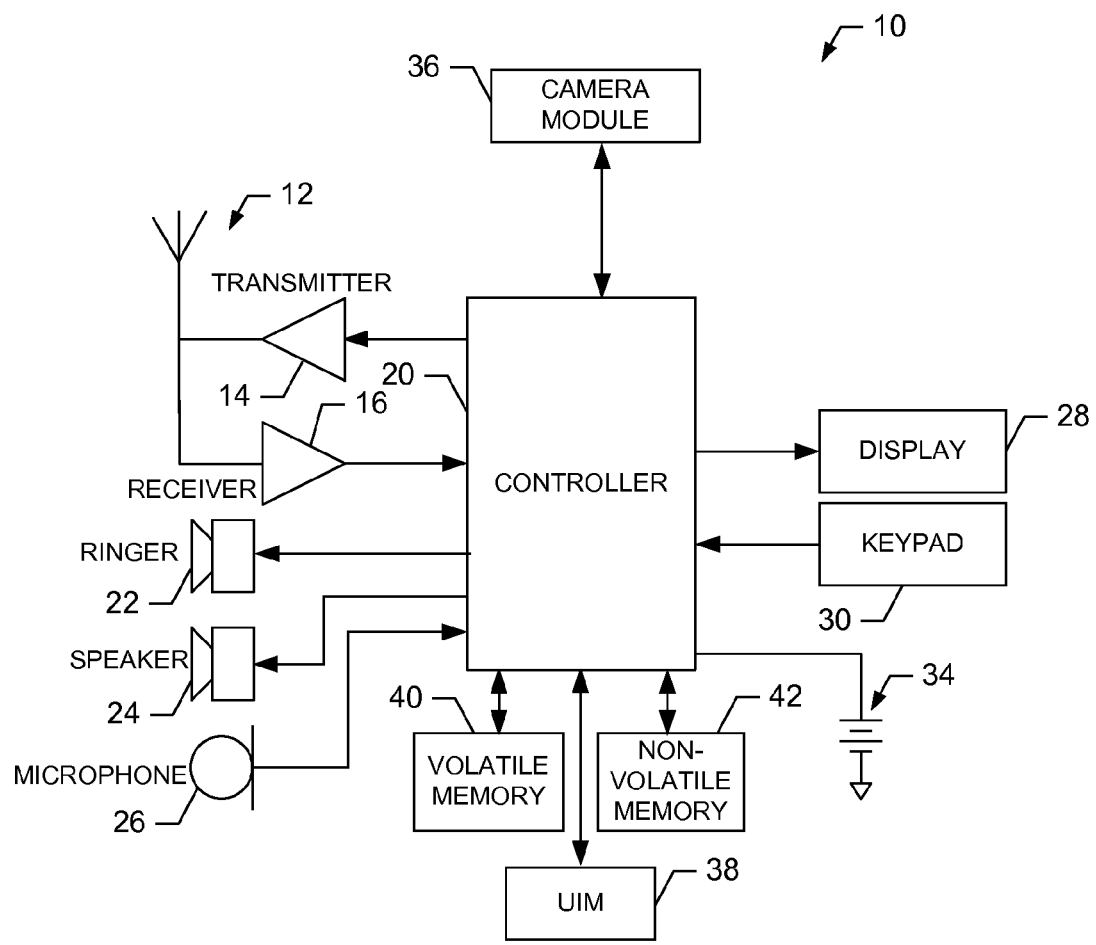
FIG. 1 is a schematic block diagram of a mobile terminal according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a physical storage medium (e.g., volatile or non-volatile memory device), can be differentiated from a "computer-readable transmission medium," which refers to an electromagnetic signal. As used herein, the term "configured to" should be understood to denote a structural construction or modification of a device or element to enable the performance of the corresponding function or action described in association therewith.

Some embodiments may be employed to, for example, provide an ability for a device employing a multi-core processor to decode video content of a corresponding number of threads with synchronization being handled at the macroblock row level. By handling synchronization at the macroblock row level, the amount of overhead necessary to manage synchronization is significantly reduced as compared to the overhead needed to synchronize at the macroblock level. Thus, although embodiments could be employed in either fixed or mobile environments, particularly in mobile environments, the benefits of multi-core processing may be experienced while increasing battery consumption efficiency.

FIG. 1, one exemplary embodiment of the invention, illustrates a block diagram of a mobile terminal 10 that may benefit from embodiments. It should be understood, however, that a mobile terminal as illustrated and hereinafter described is merely illustrative of one type of device that may benefit from embodiments of the present invention and, therefore, should not be taken to limit the scope of embodiments. As such, it should be appreciated that at least some of the components described below in connection with the mobile terminal 10 are optional and thus some embodiments may include more, less or different components than those described in connection with the example embodiment of FIG. 1.

Moreover, embodiments may also be practiced in connection with fixed devices and not only in connection with mobile terminals. The mobile terminal 10 of FIG. 1 could be any of a number of types of mobile electronic devices such as, for example, portable digital assistants (PDAs), pagers, mobile televisions, gaming devices, cellular phones, all types of computers (e.g., laptops or mobile computers), cameras, audio/video players, radios, global positioning system (GPS) devices, or any combination of the aforementioned, and other types of communications systems.

The mobile terminal 10 may include an antenna 12 (or multiple antennas) in operable communication with a transmitter 14 and a receiver 16. The mobile terminal 10 may further include an apparatus, such as a controller 20 or other processing device that provides signals to and receives signals from the transmitter 14 and receiver 16, respectively.

The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9 G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks. However, in some embodiments, the mobile terminal 10 (or fixed device employing an example embodiment) may not include communication capabilities with external devices.

It is understood that the controller 20 may include circuitry implementing, among others, audio and logic functions of the mobile terminal 10. For example, the controller 20 may comprise one or more digital signal processor devices, microprocessor devices, and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example. In an example embodiment, the controller 20 may be embodied as a multi-core processor such as a dual or quad core processor. However, any number of processors may be included in the controller 20.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

In some embodiments, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 36 may provide live image data to the display 28. Moreover, in an exemplary embodiment, the display 28 may be located on one side of the mobile terminal 10 and the camera module 36 may include a lens positioned on the opposite side of the mobile terminal 10 with respect to the display 28 to enable the camera module 36 to capture images on one side of the mobile terminal 10 and present a view of such images to the user positioned on the other side of the mobile terminal 10.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10.

An exemplary embodiment of the invention will now be described with reference to FIG. 2, in which certain elements of an apparatus for enabling the provision of multi-thread video decoding are displayed. The apparatus of FIG. 2 may be employed, for example, on the mobile terminal 10 of FIG. 1. However, it should be noted that the apparatus of FIG. 2, may also be employed on a variety of other devices (both mobile and fixed), and therefore, embodiments should not be limited to application on devices such as the mobile terminal 10 of FIG. 1. Alternatively, embodiments may be employed on a combination of devices including, for example, those listed above. Accordingly, embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Figure 2:
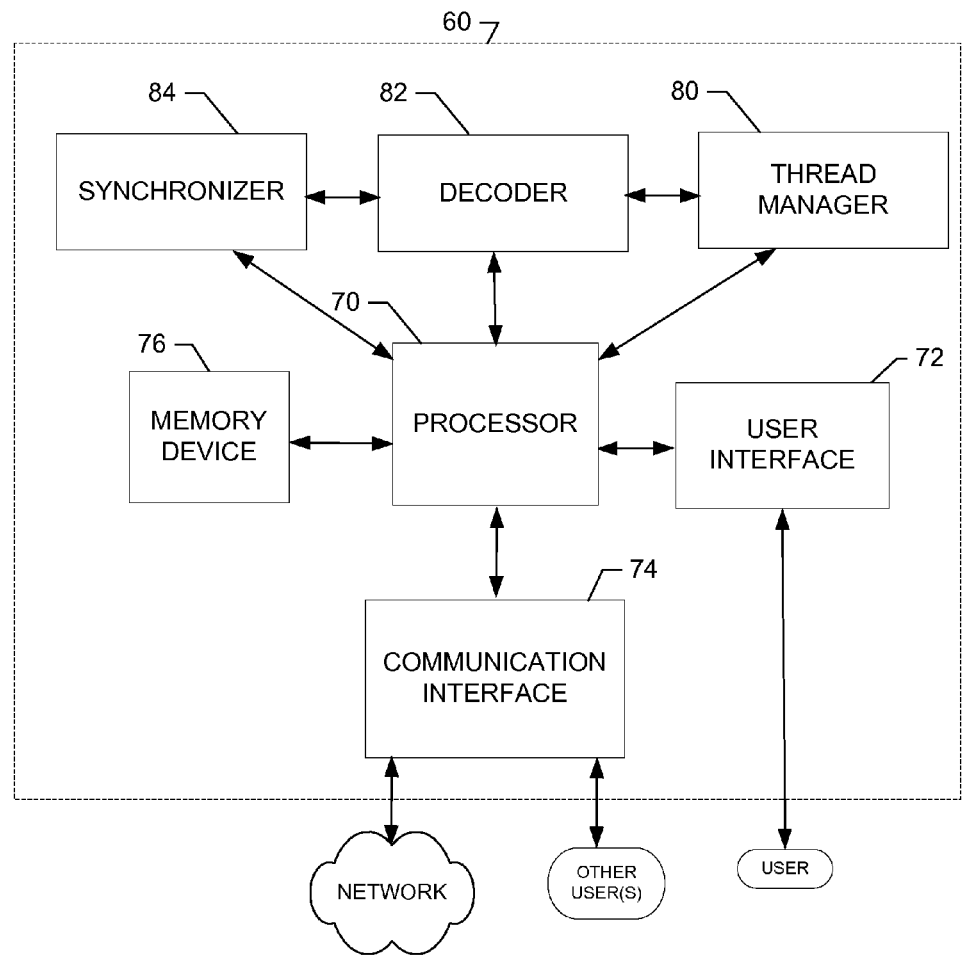
FIG. 2 is a schematic block diagram of an apparatus for providing multi-thread video decoding according to an example embodiment of the present invention.

Referring now to FIG. 2, an apparatus 60 for enabling the provision of multi-thread video decoding is provided. The apparatus 60 may include or otherwise be in communication with a multi-core processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with exemplary embodiments of the present invention. For example, the memory device 76 could be configured to buffer input data for processing by the multi-core processor 70. Additionally or alternatively, the memory device 76 could be configured to store instructions for execution by the multi-core processor 70.

The multi-core processor 70 (which may be an example of the controller 20 of FIG. 1) may be embodied in a number of different ways. For example, the multi-core processor 70 may be embodied as two or more of various processing means such as a coprocessor, a microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the multi-core processor 70 may be configured to execute instructions stored in the memory device 76 or otherwise accessible to one or more cores of the multi-core processor 70. Alternatively or additionally, the multi-core processor 70 may be configured to execute hard coded functionality. As such, whether configured by hardware or software methods, or by a combination thereof, the multi-core processor 70 may represent an entity (e.g., physically embodied in circuitry) capable of performing operations according to embodiments of the present invention while configured accordingly. Thus, for example, when the multi-core processor 70 is embodied as two or more of an ASIC, FPGA or the like, the multi-core processor 70 may be specifically configured hardware for conducting the operations described herein. Alternatively, as another example, when the multi-core processor 70 is embodied as an executor of software instructions, the instructions may specifically configure the multi-core processor 70 to perform the algorithms and/or operations described herein when the instructions are executed. However, in some cases, the multi-core processor 70 may be a processor of a specific device (e.g., a mobile terminal or network device) adapted for employing embodiments of the present invention by further configuration of the multi-core processor 70 by instructions for performing the algorithms and/or operations described herein. Each core of the multi-core processor 70 may include, among other things, a clock, an arithmetic logic unit (ALU) and logic gates configured to support operation of the multi-core processor 70.

Although an example embodiment will be described below in connection with a dual core processor, other embodiments could be practiced in connection with additional processor cores.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such for example, the communication interface 74 may include a communication modem and/or other hardware/software for supporting communication via cable, digital subscriber line (DSL), universal serial bus (USB) or other mechanisms.

The user interface 72 may be in communication with the multi-core processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the mobile terminal 10), the user interface 72 may include, among other devices or elements, any or all of a speaker, a microphone, a display, and a keyboard or the like. In this regard, for example, the multi-core processor 70 may comprise user interface circuitry configured to control at least some functions of one or more elements of the user interface, such as, for example, a speaker, ringer, microphone, display, and/or the like. The multi-core processor 70 and/or user interface circuitry comprising the multi-core processor 70 may be configured to control one or more functions of one or more elements of the user interface through computer program instructions (e.g., software and/or firmware) stored on a memory accessible to the multi-core processor 70 (e.g., memory device 76, and/or the like).

In an exemplary embodiment, the multi-core processor 70 may be embodied as, include or otherwise control a thread manager 80, a decoder 82, and a synchronizer 84. The thread manager 80, the decoder 82 and the synchronizer 84 may each be any means such as a device or circuitry operating in accordance with software or otherwise embodied in hardware or a combination of hardware and software (e.g., multi-core processor 70 operating under software control, the multi-core processor 70 embodied as an ASIC or FPGA specifically configured to perform the operations described herein, or a combination thereof) thereby configuring the device or circuitry to perform the corresponding functions of the thread manager 80, the decoder 82, and the synchronizer 84, respectively, as described herein.

Thus, in examples in which software is employed, a device or circuitry (e.g., the multi-core processor 70 in one example) executing the software forms the structure associated with such means. Moreover, in some cases, functionality associated with the thread manager 80, the decoder 82, and/or the synchronizer 84 may be executed by a single one of the cores of the multi-core processor 70.

The decoder 82 may generally be configured to decode data that is encoded according to any of a plurality of video encoding standards. Thus, for example, the decoder 82 may be configured generally to decode video data according to H.261, H.262/MPEG-2, H.263, H.264, H.264/MPEG-4, MPEG-4 or other standards. However, the decoder 82 may be configured to operate on such data as controlled by the multi-core processor 70 based on threads provided thereto by the thread manager 80 and synchronization as performed by the synchronizer 84.

In an example embodiment, the thread manager 80 is configured to receive data that is to be decoded and divide the data into threads that are to be distributed to the respective core processors of the multi-core processor 70. In an example case, the number of threads generated by the thread manager 80 is equal to the number of core processors in the multi-core processor 80. Thus, for example, for a dual core processor, incoming video frames may be equally divided into threads that are distributed between each core processor. In some embodiments, each frame decoding operation may happen in a separate thread.

In addition to incoming video frames being divided into a number of threads that is equal to the number of core processors of the multi-core processor 70, each frame may also be divided into macroblock rows. A macroblock is a group of pixels, the size of which depends on the corresponding encoding standard employed (e.g., 4×4, 8×8, 12×12 or 16×16 pixel groups). Thus, a macroblock row is a row of macroblocks as shown in FIG. 3, which shows row X and row R.

Figure 3:
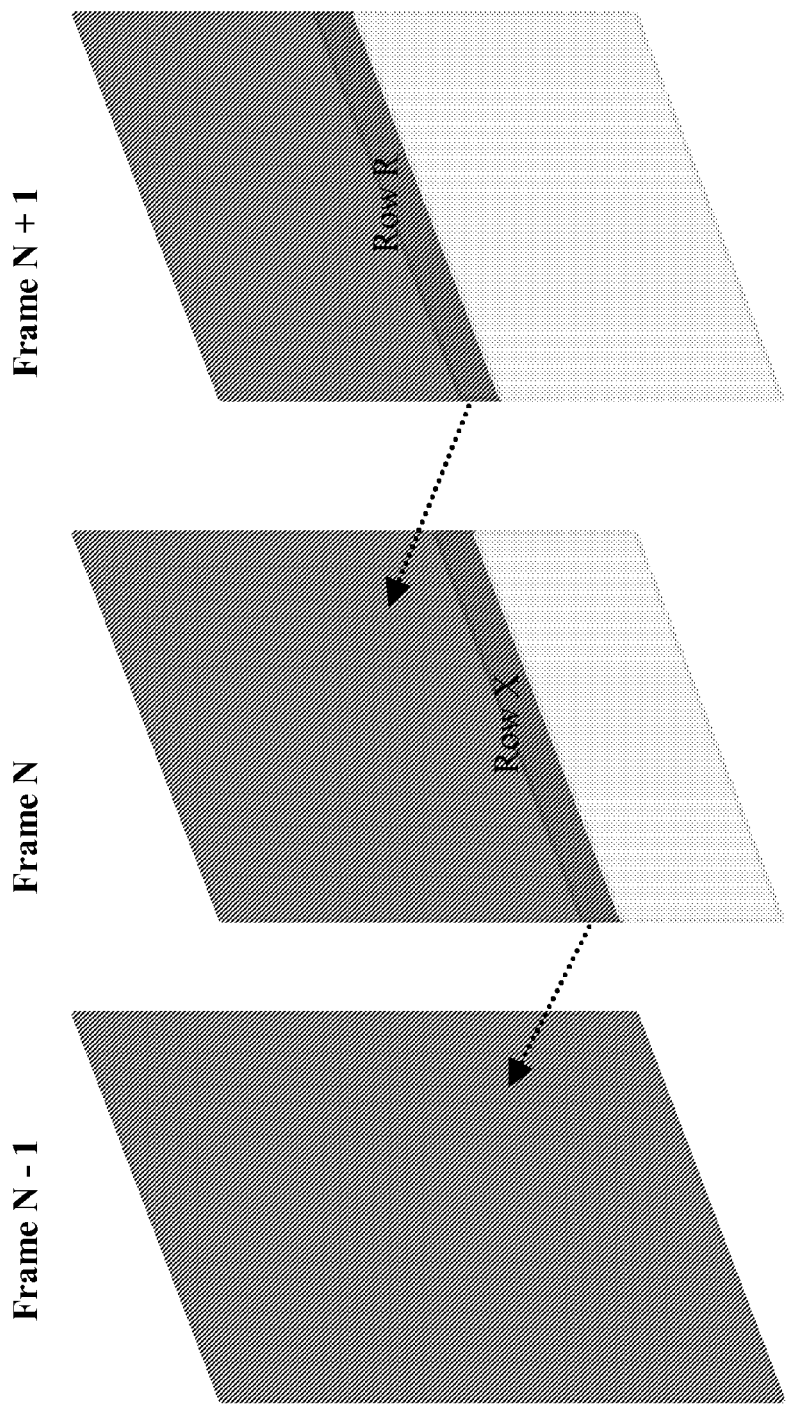
FIG. 3 illustrates an example of parallel decoding of video frames in multiple threads that are synchronized at a macroblock row level according to an example embodiment of the present invention.

FIG. 3 illustrates an example of parallel decoding of video frames in multiple threads that are synchronized at a macroblock row level according to an example embodiment of the present invention. In this regard, FIG. 3 shows two frames (frame N and frame N+1) for which data corresponding to row X and row R are being decoded in separate threads. Row X and row R may each represent a row of macroblocks of a corresponding frame being executed in respective different threads. Generally speaking, standards typically limit the allowable range of absolute or differential motion vectors from one frame as compared to a reference frame. The reference frame could be a past frame (e.g., frame N−1), or any other frame including a future frame, depending on the standard employed. Thus, a current frame (e.g., frame N) may have a dependency with respect to a reference frame (e.g., frame N−1). Similarly, a subsequent frame (e.g., frame N+1) may have a dependency with respect to the current frame (e.g., frame N). These dependencies are illustrated by the arrows that extend from frame N to frame N−1 and from frame N+1 to frame N, respectively. Based on these dependencies, a cache or other portion of the memory device 76 (e.g., a commonly accessible cache for each of the multiple cores of the multi-core processor 70 such as an L2 or L3 cache) may be used for storage of data corresponding to the frames of each respective thread being decoded and a reference frame. Thus, for many situations, the number of frames stored in the cache or memory may be equal to one more than the number of active threads running on the processor cores of the multi-core processor 70 or one more than the number of threads.

Once the frames are assigned to threads by the thread manager 80 the processing of the frame begins at the macroblock row level. Before beginning processing of a macroblock row, a check may be made to ensure availability of data in the reference frame. If the data is not available, then the synchronizer 84 may put the current frame in a wait state. During processing, the decoder 82 may decode the threads while the synchronizer 84 performs synchronization as described in greater detail below.

The synchronizer 84 may be configured to work with the decoder 82 to provide synchronization during the decoding process. In this regard, for example, the synchronizer 84 may be configured to perform synchronization based on the availability of decoded macroblock rows in the reference frame. In some embodiments, the synchronization may be performed prior to decoding each respective macroblock row. By performing synchronization at the macroblock row level, rather than at the macroblock level, synchronization overhead may be significantly reduced. For example, rather than synchronizing for every single macroblock (e.g., 396 operations for CIF (common intermediate format) and 1200 operations for VGA (video graphics array)) a significantly reduced number of checks may be performed (e.g., 18 for CIF and 30 for VGA).

As indicated above, video standards typically limit the vertical range of absolute motion vectors to a couple of macroblock rows, depending on the level of information indicated in the bitstream. Limits on the absolute motion vectors may be direct or indirect.

Figure 4:
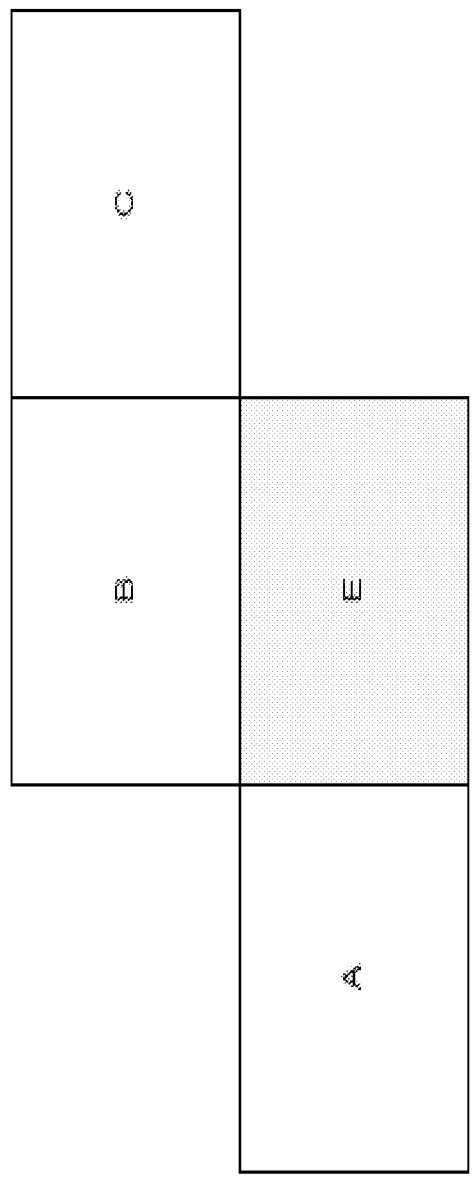
FIG. 4 shows a basic view of macroblock motion vectors to illustrate a relationship between absolute motion vectors, differential motion vectors and predicted motion vectors according to an example embodiment of the present invention.

As an example, standards like H.264 specify the maximum absolute motion vector of a macroblock in the vertical direction thereby directly limiting the absolute motion vectors. Meanwhile, standards like On2VP6 specify a maximum range for differential motion vectors, which provides an indirect limit on the absolute motion vector. FIG. 4 shows a basic view of macroblocks A, B, C and E to illustrate a relationship between absolute motion vectors, differential motion vectors and predicted motion vectors according to an example embodiment. In this regard, the absolute motion vector for E is equal to the predicted motion vector of E plus the differential motion vector of E. In some embodiments, the predicted motion vector of a particular macroblock can be estimated by considering that the median (mv1, mv2, mv3) is always less than or equal to the maximum (mv1, mv2, mv3). Thus, the predicted motion vector for a particular macroblock may be considered to be less than or equal to the maximum motion vector of the previous row. In the context of the example of FIG. 4, the predicted motion vector for E may be estimated by taking the median of the motion vectors (MV) for macroblock motion vectors above E (e.g., $MV_B$), to the left of E (e.g., $MV_A$), and to the top and right of E (e.g., $MV_C$). In this regard, if $MV_A$ is maximum, then the median will be either $MV_B$ or $MV_C$ (so the predicted range is limited to the maximum MV of the previous row. Similarly, if $MV_B$ is maximum, then the median will be either $MV_A$ or $MV_C$ and if $MV_C$ is maximum, then the median will be either $MV_B$ or $MV_A$. Accordingly, the range of the predicted motion vector may be limited in advance based on the maximum motion vectors of the prior row.

In other words, a maximum limit to the motion vector of the current macroblock row may be set by adding the maximum motion vector of the previous macroblock row to the maximum differential motion vector defined by the standard.

Before the decoder starts decoding a macroblock row, a check may be made to see that the position pointed to in the reference frame by adding current row position and the maximum vertical motion vector range, as defined by the corresponding standard employed, has been decoded. If the position pointed to has not been decoded, execution of the current thread may be suspended until such decoding occurs. In some embodiments, a pthread_cond_wait application programming interface (API) may be employed to initiate the suspension. After decoding each macroblock row, a thread may call a pthread_cond_broadcast API to signal any thread currently being suspended to resume execution. Thus, if one particular thread is waiting for a specific macroblock row to be decoded, the particular thread may resume execution as soon as signaling is received to indicate that the specific macroblock row has been decoded. Since frame decoding of a particular thread is executed on the same corresponding core, even if there is a suspension, caches need not be flushed since relevant data will still be present in the cache.

In some cases, a check may also be made as to whether macroblock row data is ready before the pthread_cond_broadcast API is called. In this regard, for standards that support an inloop deblocking filter or an unrestricted motion vector, deblocking and frame padding may be completed, respectively, prior to a macroblock row being considered to be ready for calling of the pthread_cond_broadcast API. Furthermore, some embodiments may employ a provision for handling long term picture buffers. In this regard, if a frame that is being decoded is to be placed into a long term picture buffer queue, then the corresponding pointer may be provided to frames that desire access to the long term picture buffer during the decoding of a frame. After decoding of the frame is completed, the frame may be copied into memory marked separately for the long term picture buffer. The frame pointer may also be restored to point back to the long term picture buffer.

In some embodiments, the synchronizer 84 may be configured to also provide refinements to the synchronization performed and/or provide synchronization operations that are specific to a particular standard or coding scheme. As an example, for video decoders that use a context adaptive decoding process such as context adaptive binary arithmetic coding (CABAC), probability tables for a frame may be updated after tables for a previous frame have been updated. Thus, at a first point of synchronization, the tables from a previous frame are used to update the table for the current frame and then CABAC initialization may occur for the current frame. This particular coding scheme specific operation may occur at the beginning of every frame for embodiments that employ CABAC or other context adaptive decoding processes.

Refinements to the synchronization process may be provided by the synchronizer 84 in the form of overall fine tuning adjustments. In some cases, information regarding cache size (e.g., L2/L3 cache size) and frame resolution may be utilized in connection with making fine tuning adjustments. In this regard, for example, information regarding cache size and frame resolution may be used to limit the maximum lag between decoding of two successive frames. The cache (e.g., L2/L3 caches) may be shared between each core of the multi-core processor 70. Thus, by adapting a lag threshold, efforts may be made to provide that a macroblock row that forms the reference for a subsequent frame is available in the cache.

As an example, consider a dual core processor having a shared L2 cache that is 512 KB in size. Decoding for VGA sized video having YUV 4:2:0 data would yield a VGA frame size of 640×480×1.5=450 KB. For such a system, there may be at least 3 frame buffers being used simultaneously (e.g., one for the reference frame and one for the current and subsequent frames as shown in FIG. 3). A ratio of available L2/L3 cache may be calculated relative to the memory requirement for 3 frames. In this example, the ratio is 512/450*3~0.38.

By multiplying this number by the number of rows in the frame, a maximum lag between two frames may be determined. Thus, in this example for VGA, the maximum lag would be 0.38×30~11 rows. However, the lag is limited to a maximum of the number of rows in the frame and to a minimum of the motion vector range, as specified by the standard. Accordingly, if it is desirable to decode a QVGA video on such a system the ratio is 512/(112.5×3)~1.5. Therefore, QVGA may allow for a full frame lag and it may not be necessary to apply this particular synchronization for QVGA. Thus, if it appears as though one particular frame is leading another frame that is using the particular frame as a reference, the particular frame may be stalled until the other frame catches up.

Accordingly, based on the description above, the use of the thread manager 80 and the synchronizer 84 in connection with the decoder 82 may provide for a reduction in decoding time by using multiple cores for processing, but still limit overhead and therefore conserve battery power. Thus, even mobile terminals may be enabled to provide playback of high resolution and high frame rate video content. Embodiments of the present invention also offer flexibility to work with multiple different types of video decoders while offering performance gains that do not necessarily require specifically tailored strategies.

Figure 5:
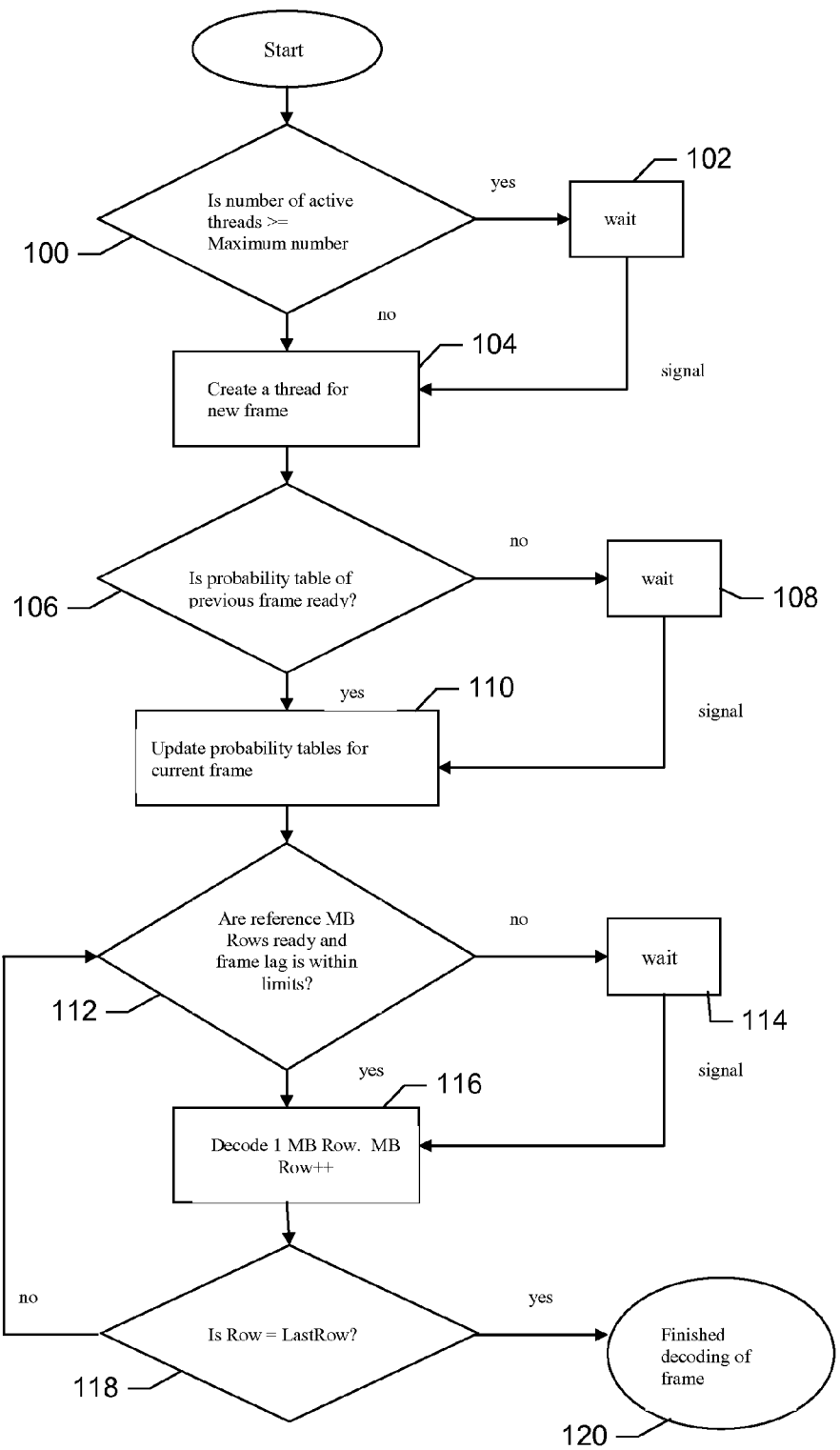
FIG. 5 is a block diagram showing processing flow for multi-thread video decoding, according to an example embodiment of the present invention.

FIG. 5 is a block diagram showing processing flow for multi-thread video decoding, according to an example embodiment of the present invention. In this regard, as shown in FIG. 5, a determination may be made at operation 100 as to whether a number of active threads is equal to the maximum number of threads. If the number of active threads is equal to the maximum number of threads, then the system may wait at operation 102 until a signal is received to indicate that the number of active threads is less than the maximum number of threads. When the number of active threads is less than the maximum number of threads, a thread may be created (e.g., by the thread manager 80) at operation 104. A determination may then be made as to whether a probability table of a previous frame is ready at operation 106. If the probability table is not ready, then the system may wait at operation 108 until a signal is received to indicate that the table is ready. If the table is ready, an update of the probability tables for the current frame may be undertaken at operation 110. After table updating, a determination may be made as to whether reference macroblock rows are ready and frame lag is within limits at operation 112. If reference macroblock rows are not ready or frame lag is not within limits, a delay may again be inserted at operation 114 until such conditions clear. If reference macroblock rows are ready and frame lag is within limits, a corresponding macroblock row may be decoded at operation 116. A determination may then be made at operation 118 as to whether the decoded macroblock row is the last row. If it is not the last row, operation may return to operation 112 to repeat the corresponding determination for a subsequent row. However, if the last row has been decoded, then frame decoding may be finished at operation 120.

Figure 6:
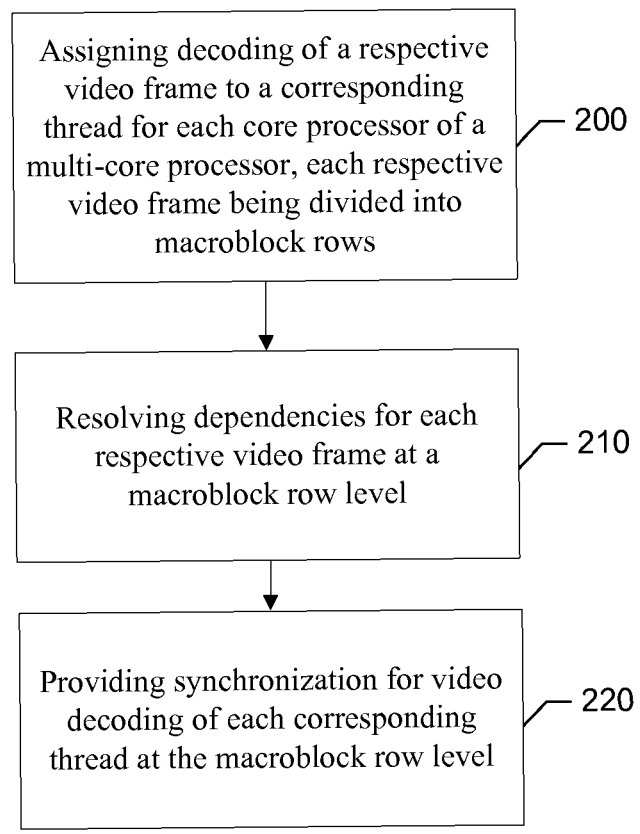
FIG. 6 is a block diagram according to an exemplary method for enabling the provision of multi-thread video decoding according to an exemplary embodiment of the present invention.

FIG. 6 is a flowchart of a system, method and program product according to exemplary embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

In this regard, one embodiment of a method for enabling provision of multi-thread video decoding may include assigning decoding of a respective video frame to a corresponding thread for each processor core of a multi-core processor in which each respective video frame is divided into macroblock rows at operation 200. The method may further include resolving dependencies for each respective video frame at a macroblock row level at operation 210 and providing synchronization for video decoding of each corresponding thread at the macroblock row level at operation 220.

In some embodiments, certain ones of the operations above may be modified or further amplified as described below. Modifications or amplifications to the operations above may be performed in any order and in any combination. In this regard, for example, resolving dependencies may include determining an availability of a decoded macroblock row in a reference frame. In such an embodiment, providing synchronization may include performing synchronization based on the availability of the decoded macroblock row in the reference frame. In an example embodiment, resolving dependencies may include determining whether a position pointed to in a reference frame has been decoded prior to decoding a macroblock row. The position pointed to may be determined by adding current row position and a maximum vertical motion vector range. In some cases, resolving dependencies may include limiting a predicted motion vector in advance based on a maximum motion vector of a prior row. In an example embodiment, providing synchronization may include updating a probability table for a frame after a probability table for a previous frame has been updated for a video decoder that uses a context adaptive decoding process. In some embodiments, providing synchronization may include limiting a maximum lag between decoding successive frames based on frame resolution and cache size of a cache having shared access among each core processor of the multi-core processor.

In an exemplary embodiment, an apparatus for performing the method of FIG. 6 above may comprise one or more processors (e.g., the multi-core processor 70) configured to perform some or each of the operations (200-220) described above. The processors may, for example, be configured to perform the operations (200-220) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-220 may comprise, for example, corresponding ones of the multi-core processor 70, the thread manager 80, the decoder 82, the synchronizer 84 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   at least one processor; and
   at least one memory including computer program code, the at least one memory and the computer program code configured to, with the at least one processor, cause the apparatus to at least perform:
   assigning decoding of a respective video frame to a corresponding thread for each core processor of a multi-core processor, each respective video frame being divided into macroblock rows;
   resolving dependencies for the each respective video frame at a macroblock row level; and
   providing synchronization for video decoding of each corresponding thread at the macroblock row level; where
   resolving dependencies comprises during decoding limiting a predicted motion vector in advance based on a maximum motion vector of a prior row; and
   where synchronization is provided by limiting a maximum lag between decoding successive frames based on frame resolution and cache size of a cache having shared access among each core processor of the multi-core processor.

2. The apparatus of claim 1, wherein the at least one memory and computer program code are configured to, with the at least one processor, cause the apparatus at least to further perform:
   resolving dependencies by determining an availability of a decoded macroblock row in a reference frame.

3. The apparatus of claim 2, wherein the at least one memory and computer program code are configured to, with the at least one processor, cause the apparatus at least to further perform:
   providing synchronization by performing synchronization based on the availability of the decoded macroblock row in the reference frame.

4. The apparatus of claim 1, wherein the at least one memory and computer program code are configured to, with the at least one processor, cause the apparatus at least to further perform:
   resolving dependencies by determining whether a position pointed to in a reference frame has been decoded prior to decoding a macroblock row, the position pointed to being determined by adding current row position and a maximum vertical motion vector range.

5. The apparatus of claim 1, wherein the at least one memory and computer program code are configured to, with the at least one processor, cause the apparatus at least to further perform:
   providing synchronization by updating a probability table for a frame after a probability table for a previous frame has been updated for a video decoder that uses a context adaptive decoding process.

6. A method comprising:
- assigning decoding of a respective video frame to a corresponding thread for each core processor of a multi-core processor, each respective video frame being divided into macroblock rows;
- resolving dependencies for each respective video frame at a macroblock row level;
- providing synchronization for video decoding of each corresponding thread at the macroblock row level; where
- resolving dependencies comprises during decoding limiting a predicted motion vector in advance based on a maximum motion vector of a prior row; and
- where synchronization is provided by limiting a maximum lag between decoding successive frames based on frame resolution and cache size of a cache having shared access among each core processor of the multi-core processor.

7. The method of claim 6, wherein resolving dependencies comprises determining an availability of a decoded macroblock row in a reference frame.

8. The method of claim 7, wherein providing synchronization comprises performing synchronization based on the availability of the decoded macroblock row in the reference frame.

9. The method of claim 6, wherein resolving dependencies comprises determining whether a position pointed to in a reference frame has been decoded prior to decoding a macroblock row, the position pointed to being determined by adding current row position and a maximum vertical motion vector range.

10. The method of claim 6, wherein providing synchronization comprises updating a probability table for a frame after a probability table for a previous frame has been updated for a video decoder that uses a context adaptive decoding process.

11. A computer program product comprising at least one non-transitory computer-readable storage medium having computer-executable program code instructions stored thereon, the computer-executable program code instructions when executed by an apparatus cause the apparatus to perform:
- assigning decoding of a respective video frame to a corresponding thread for each core processor of a multi-core processor, each respective video frame being divided into macroblock rows;
- resolving dependencies for each respective video frame at a macroblock row level; and
- providing synchronization for video decoding of each corresponding thread at the macroblock row level; where
- resolving dependencies comprises during decoding limiting a predicted motion vector in advance based on a maximum motion vector of a prior row; and
- where synchronization is provided by limiting a maximum lag between decoding successive frames based on frame resolution and cache size of a cache having shared access among each core processor of the multi-core processor.

12. The computer program product of claim 11, wherein program code instructions cause the apparatus at least to further perform:
- determining an availability of a decoded macroblock row in a reference frame.

13. The computer program product of claim 12, wherein program code instructions cause the apparatus at least to further perform:
- synchronizing based on the availability of the decoded macroblock row in the reference frame.

14. The computer program product of claim 11, wherein program code instructions cause the apparatus at least to further perform:
- determining whether a position pointed to in a reference frame has been decoded prior to decoding a macroblock row, the position pointed to being determined by adding current row position and a maximum vertical motion vector range.

15. The computer program product of claim 11, wherein program code instructions cause the apparatus at least to further perform:
- updating a probability table for a frame after a probability table for a previous frame has been updated for a video decoder that uses a context adaptive decoding process, or limiting a maximum lag between decoding successive frames based on frame resolution and cache size of a cache having shared access among each core processor of the multi-core processor.

* * * * *